US011410314B2

(12) United States Patent
Duke et al.

(10) Patent No.: US 11,410,314 B2
(45) Date of Patent: Aug. 9, 2022

(54) IMAGE PROCESSING USING A CONVOLUTIONAL NEURAL NETWORK TO TRACK A PLURALITY OF OBJECTS

(71) Applicant: L'Oreal, Paris (FR)

(72) Inventors: Brendan Duke, Toronto (CA); Abdalla Ahmed, Toronto (CA); Edmund Phung, Toronto (CA); Irina Kezele, Toronto (CA); Parham Aarabi, Richmond Hill (CA)

(73) Assignee: L'Oreal, Paris (FR)

( * ) Notice: Subject to any disclaimer, the term of this patent is extended or adjusted under 35 U.S.C. 154(b) by 156 days.

(21) Appl. No.: 16/861,368

(22) Filed: Apr. 29, 2020

(65) Prior Publication Data

US 2020/0349711 A1 Nov. 5, 2020

Related U.S. Application Data

(60) Provisional application No. 62/840,718, filed on Apr. 30, 2019.

(51) Int. Cl.
*G06T 7/11* (2017.01)
*G06K 9/62* (2022.01)
(Continued)

(52) U.S. Cl.
CPC .............. *G06T 7/11* (2017.01); *G06K 9/628* (2013.01); *G06K 9/629* (2013.01); *G06N 3/04* (2013.01);
(Continued)

(58) Field of Classification Search
None
See application file for complete search history.

(56) References Cited

U.S. PATENT DOCUMENTS 10,176,388 B1 * 1/2019 Ghafarianzadeh ... G06N 3/0454
2015/0356669 A1 * 12/2015 Roescheisen ........ A45D 29/001
705/5
(Continued)

FOREIGN PATENT DOCUMENTS

CN 106570564 A 4/2017

OTHER PUBLICATIONS

International Search Report dated Aug. 3, 2020 in PCT/CA2020/050566, 5 pages
(Continued)

*Primary Examiner* — Frank S Chen
(74) *Attorney, Agent, or Firm* — Oblon, McClelland, Maier & Neustadt, L.L.P.

(57) ABSTRACT

Presented is a convolutional neural network (CNN) model for fingernail tracking, and a method design for nail polish rendering. Using current software and hardware, the CNN model and method to render nail polish runs in real-time on both iOS and web platforms. A use of Loss Mean Pooling (LMP) coupled with a cascaded model architecture simultaneously enables pixel-accurate fingernail predictions at up to 640×480 resolution. The proposed post-processing and rendering method takes advantage of the model's multiple output predictions to render gradients on individual fingernails, and to hide the light-colored distal edge when rendering on top of natural fingernails by stretching the nail mask in the direction of the fingernail tip. Teachings herein may be applied to track objects other than fingernails and to apply appearance effects other than color.

32 Claims, 11 Drawing Sheets

(51) Int. Cl.
*G06T 11/00* (2006.01)
*G06T 3/40* (2006.01)
*G06T 11/60* (2006.01)
*G06T 7/73* (2017.01)
*G06T 7/246* (2017.01)
*G06N 3/04* (2006.01)
*G06N 3/08* (2006.01)
*G06T 7/194* (2017.01)

(52) U.S. Cl.
CPC .............. *G06N 3/08* (2013.01); *G06T 3/40* (2013.01); *G06T 7/194* (2017.01); *G06T 7/246* (2017.01); *G06T 7/73* (2017.01); *G06T 11/001* (2013.01); *G06T 11/60* (2013.01); *G06T 2200/24* (2013.01); *G06T 2207/20016* (2013.01); *G06T 2207/20081* (2013.01); *G06T 2207/20084* (2013.01); *G06T 2207/30196* (2013.01)

(56) References Cited

U.S. PATENT DOCUMENTS

| | | | |
|---|---|---|---|
| 2019/0026538 A1* | 1/2019 | Wang | G06K 9/4642 |
| 2019/0205667 A1* | 7/2019 | Avidan | G06N 3/08 |
| 2020/0193609 A1* | 6/2020 | Dharur | G06T 7/11 |

OTHER PUBLICATIONS

Written Opinion of the International Searching Authority dated Aug. 3, 2020 in PCT/CA2020/050566, 6 pages.

Alberto Garcia-Garcia, et al., "A Survey on Deep Learning Techniques for Image and Video Semantic Segmentation" Applied Soft Computing, vol. 70, Sep. 2018, pp. 41-65.

Aman Raj, et al., "Multi-Scale Convolutional Architecture for Semantic Segmentation" The Robotics Institute, Carnegie Mellon University, Sep. 2015, 17 Pages.

Hengshuang Zhao, et al., "ICNet for Real-Time Semantic Segmentation on High-Resolution Images" 15th European Conference on Computer Vision ECCV 2018, Lecture Notes in Computer Science, vol. 11207, Sep. 2018, pp. 1-16.

* cited by examiner

1100

1: Run connected components [13] on the class predictions to find a bounding box for each nail.

2: for all detected nails do

3: Estimate the nail's angle by averaging the direction predictions.

4: Compute a rotated rectangle based on this angle and the labels.

5: Copy the image region from the rotated rectangle and stretch the tip outwards to eliminate the white portion of the tip.

6: end for

7: Compute the average colour over all nails.

8: Blur the image from line 5. Replace regions outside the nail with the average nail colour before blurring, in order to prevent the regions outside of the nail from "bleeding" into the nail during blurring.

9: for all nails do

10: Render a gradient of the target colour into the region, masked by the nail mask.

11: Amplify the bright regions on the image from 4, to approximate specular reflections.

12: Consider a pixel bright if its brightness is higher than the average brightness of the fingernail.

13: Re-colour the amplified image to match the target colour, and blend the result on top of the current nail using "hard light" blending.

14: end for

Fig. 11

IMAGE PROCESSING USING A CONVOLUTIONAL NEURAL NETWORK TO TRACK A PLURALITY OF OBJECTS

CROSS-REFERENCE TO RELATED APPLICATIONS

This application claims the benefit of priority from U.S. Provisional Application No. 62/840,718 filed Apr. 30, 2019, the entire contents of which are incorporated herein by reference.

1 FIELD

The following relates to processing images, including video images, using a computing device adapted with a convolutional neural network (CNN) where such a computing device may include a consumer-oriented smartphone or tablet and more particularly relates to image processing using a CNN to track (e.g. semantically segment) a plurality of objects such as fingernails in videos.

2 BACKGROUND

The fingernail tracking problem is to locate and identify fingernails from a video stream in real time with pixel accuracy. Additionally it is desired to support rendering techniques to adapt an image from a video stream such as to provide an augmented reality. It may be desired to locate and identify objects other than fingernails in an image, including in a video stream.

3 SUMMARY

Presented is an end-to-end solution for simultaneous real-time tracking of fingernails and rendering of nail polish. An entirely new dataset with semantic segmentation and landmark labels was collected. A high-resolution neural network model was developed for mobile devices and trained using the new dataset. In addition to providing semantic segmentation, the model provides directional information such as to indicate orientation. Post-processing and rendering operations are provided for nail polish try-on, which operations use at least some of the outputs of the model.

Though described in relation to fingernails, other objects may be similarly processed for segmentation and for image updating. Such other objects may also be small objects with simple boundaries (e.g. fingernails, toenails, shoes, cars (automobiles), license plates or car parts on cars, etc.). The term "small" herein is a relative term in relation to scale and the overall image's size. For example, fingernails are relatively small compared to the size of a hand that is captured in the image including the finger nails. Cars in a group of cars imaged at a distance are similarly small as are a group of prunes (or other fruit) imaged on a table. The model is well suited to generalization to classify sets of objects with known count and constellation (like here, classifying fingertips of a hand).

There is provided a computing device comprising a processor and a storage device coupled thereto, the storage device storing a CNN and instructions, which when executed by the processor, configure the computing device to: process an image comprising a plurality of objects with the CNN, the CNN configured to semantically segment the plurality of objects within the image, the CNN comprising a cascaded semantic segmentation model architecture having: a first branch providing deep learning of low resolution features; and a second branch providing shallow learning of high-resolution features; wherein the CNN combines respective predictions from the first branch and the second branch to output information comprising foreground/background and object class segmentations.

The CNN may combine the respective predictions from the first branch and the second branch such that the information as output from the CNN further comprises directionality information.

The first branch may comprise an encoder-decoder backbone to produce respective predictions of the first branch. A respective prediction of the first branch comprises a combination of an initial prediction produced following an encoder phase of the first branch with a further prediction produced following further processing by a decoder phase of the first branch. The initial prediction and further prediction may be combined using a first branch fusion block to produce the respective prediction of the first branch for providing for further combining with a respective prediction of the second branch.

A respective prediction of the second branch may be produced following processing by an encoder phase of the second branch, in cascade with the first branch. A respective prediction ($F_1$) of the first branch may be combined with the respective prediction ($F_2$) of the second branch using a second branch fusion block. $F_1$ may comprise up-sampled low-resolution, high semantic information features and $F_2$ may comprise high-resolution, low semantic information features. The second branch fusion block thus combines $F_1$ and $F_2$ to produce high-resolution fused features $F_2'$ in a decoder phase of the second branch. The CNN may use a convolutional classifier applied to the respective prediction $F_1$ to produce down-sampled class labels. To process $F_2$, the CNN may use multiple output decoder branches to produce the foreground/background and object class segmentations and the directionality information.

The multiple output decoder branches may comprise: a first output decoder branch having a 1×1 convolutional block and an activation function to produce the foreground/background segmentations; a second output decoder branch having a 1×1 convolutional block and an activation function to produce the object class segmentations; and a third output decoder branch having a 1×1 convolutional block to produce the directional information.

The CNN may be trained using a Loss Max-Pooling (LMP) loss function for overcoming pixel-wise class imbalance in semantic segmentation to determine the foreground/background segmentations.

The CNN may be trained using a negative log likelihood loss (NLL) function to determine the foreground/background and object class segmentations.

The CNN may be trained using a Huber loss function to determine the directionality information.

Each object may comprise a base and a tip and the directionality information may comprise base-tip direction fields.

The first branch may be defined using a MobileNetV2 encoder-decoder structure and the second branch may be defined using an encoder structure from the MobileNetV2 encoder-decoder structure. The CNN may be initially trained using training data from ImageNet and thereafter trained using an object tracking dataset for the plurality of objects labelled with ground truths.

The instructions may further configure the computing device to perform image processing to produce an updated image from the image using at least some of the information as output. To perform image processing may use the at least some of the foreground/background and object class segmentations and directionality information to change an appearance such as a colour of the plurality of objects.

The computing device may comprising a camera and be configured to: present a user interface to receive an appearance choice to apply to the plurality of objects and receive, from the camera, a selfie video image for use as the image and; process the selfie video image to produce the updated image using the appearance choice; and present the updated image to simulate an augmented reality.

The computing device may comprise a smartphone or tablet.

The image may comprise at least a portion of a hand having fingernails and the plurality of objects may comprise fingernails. The CNN may be defined to provide a Laplacian pyramid of output information.

There is provided a computing device comprising a processor and a storage device coupled thereto, the storage device storing instructions, which when executed by the processor, configure the computing device to: receive CNN output comprising foreground/background and object class segmentations and directionality information for each of a plurality of objects semantically segmented by a CNN having processed an image comprising the plurality of objects; and process the image to produce an updated image by: drawing a gradient of a chosen color over each of the plurality of objects as segmented according to the foreground/background segmentations (and object class segmentations), the chosen color drawn perpendicular to a respective direction of each of the objects as indicated by the directional information.

The computing device may be configured to apply respective specular components for each of the plurality of objects over the gradient and blend a result.

The computing device may be configured to, prior to drawing, stretch respective regions of each of the plurality of objects as identified by the foreground/background segmentations to ensure a margin such as a tip thereof is included for drawing. The computing device may be configured to, prior to drawing, colour at least some adjacent regions outside the respective regions of each of the plurality of objects as stretched with an average colour determined from the plurality of objects; and blur the respective regions of each of the plurality of objects as stretched and the adjacent regions.

The computing device may be configured to receive a chosen colour for use when drawing.

There is provided a computing device comprising a processor and a storage device coupled thereto, the storage device storing a CNN and instructions, which when executed by the processor, configure the computing device to: process an image comprising a plurality of objects with the CNN, the CNN configured to semantically segment the plurality of objects within the image, the CNN comprising a cascaded semantic segmentation model architecture having: a first branch providing deep learning of low resolution features; and a second branch providing shallow learning of high-resolution features; wherein the CNN combines respective predictions from the first branch and the second branch to output information comprising foreground/background segmentation and wherein the CNN is trained using a Loss Mean Polling loss function.

The image comprises a plurality of pixels and the plurality of objects within the image are represented by a small number of the plurality of pixels. The CNN may combine the respective predictions from the first branch and the second branch to further output information comprising object class segmentations and wherein the CNN is further trained using a NLL loss function. The CNN may combine the respective predictions from the first branch and the second branch to further output information comprising directionality information and the CNN may be further trained using a Huber loss function or an L2 loss function.

The CNN may be defined to provide a Laplacian pyramid of output information.

There is provided a computing device comprising a processor and a storage device coupled thereto, the storage device storing instructions, which when executed by the processor, configure the computing device to: provide a Graphical User Interface (GUI) to annotate a dataset of images to train a CNN, the GUI having an image display portion to display a respective image to be annotated, this display portion configured to receive input to outline (segment) respective objects shown in the respective image and receive input indicating directional information for each of the respective objects; receive input to annotate the image; and save the image in association with the annotation to define the dataset.

The computing device may be configured to provide controls to receive input to semantically classify each of the respective objects.

The CNN may be configured to semantically segment the plurality of objects within the image, the CNN comprising a cascaded semantic segmentation model architecture having: a first branch providing deep learning of low resolution features; and a second branch providing shallow learning of high-resolution features; wherein the CNN combines respective predictions from the first branch and the second branch to output information comprising foreground/background and object class segmentations.

A computing device may be configured to have any of the computing device aspects or features herein. It will be apparent that related method aspects and features and related computer program product aspects and features are provided for each of the computing device aspects and features. These and others will be apparent to a person of ordinary skill in the art.

4 BRIEF DESCRIPTION OF THE DRAWINGS

FIG. 11 is an illustration of pseudo-code for operations.

Figure 1:
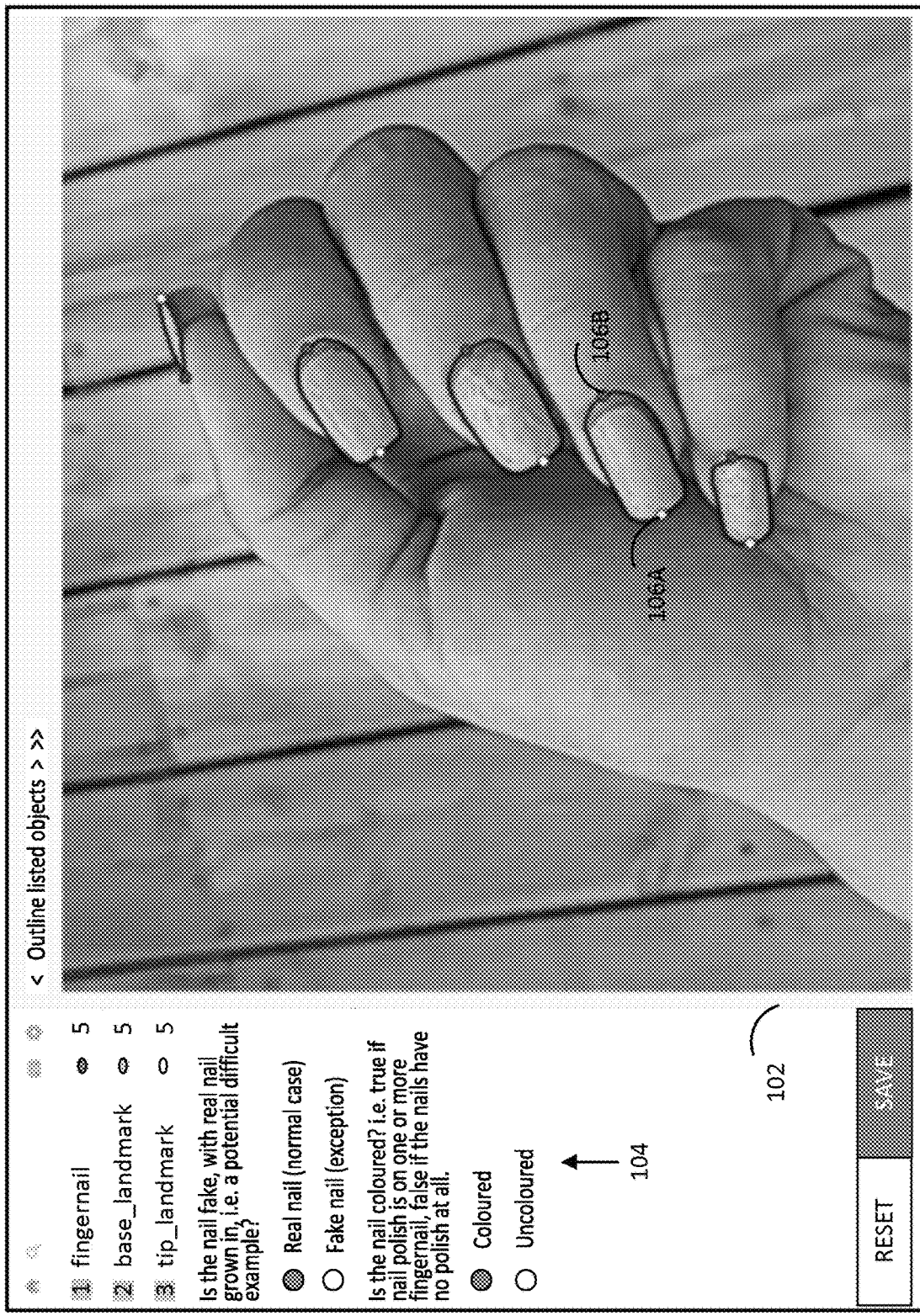
FIG. 1 is a screen shot of a graphical user interface (GUI) with which to define annotated data for a dataset in accordance with an example.

The present inventive concept is best described through certain embodiments thereof, which are described herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light. More than one inventive concept may be shown and described and each may stand-alone or be combined with one or more others unless stated otherwise.

5 DETAILED DESCRIPTION

Presented is an end-to-end solution for simultaneous real-time tracking of fingernails and rendering of nail polish. An entirely new dataset with semantic segmentation and landmark labels was collected. A high-resolution neural network model was developed for mobile devices and trained using the new dataset. In addition to providing semantic segmentation, the model provides directional information such as to indicate orientation. Post-processing and rendering operations are provided for nail polish try-on, which operations use at least some of the outputs of the model.

Though described in relation to fingernails, other objects may be similarly processed for segmentation and for image updating. Such other objects may also be small objects with simple boundaries (e.g. fingernails, toenails, shoes, cars (automobiles), license plates or car parts on cars, etc.). The term "small" herein is a relative term in relation to scale and the overall image's size. For example, fingernails are relatively small compared to the size of a hand that is captured in the image including the finger nails. Cars in a group of cars imaged at a distance are similarly small as are a group of prunes (or other fruit) imaged on a table. The model is well suited to generalization to classify sets of objects with known count and constellation (like here, classifying fingertips of a hand).

The trained models were deployed on two hardware platforms: iOS™ via Core ML™ (e.g. a native application implementation on Apple Inc. products such as an iPhone™ that supports such an environment), and web browsers via TensorFlow.js [1] (which is more platform agnostic). The following are trademarks of Apple Inc.: iOS, Core ML and iPhone. The model and post-processing operations are flexible enough to support both the higher computation native iOS platform, as well as the more resource constrained web platform, by making only minor tweaks to the model architecture, and without any major negative impact on performance.

Below are selected features:
There was created a dataset of 1438 images sourced from both photos and videos, and annotated with foreground-background, per-finger class, and base-tip direction field labels.
There was developed a novel neural network architecture for semantic segmentation designed for both running on mobile devices and precisely segmenting small objects.
There was demonstrated that Loss Max-Pooling robustly produces precise segmentation masks of small objects, which induce spatial (or pixel-wise) class imbalance.
There was developed post-processing operations that uses multiple outputs from the fingernail tracking model to both segment fingernails and localize individual fingernails, as well as to find their 2D orientation. The post-processing (including rendering) operations use these individual fingernail locations and orientations to render gradients, and to hide the light-coloured distal edge of natural fingernails.

5.1 Related Work

MobileNetV2 [2] forms the basis for the encoder of the encoder-decoder neural network architecture. The work builds on MobileNetV2 by using it as a backbone in the cascaded semantic segmentation model architecture. Furthermore, the model is agnostic to the specific encoder model used, so any existing efficient model from the literature [3, 4, 5, 6] could be used as a drop-in replacement for the encoder, as could any future efficient model including hand-designed and automatically discovered (e.g., via network pruning). MobileNetV2 satisfies the requirement for efficiency to enable the storage and execution of a model on smaller or fewer resources such as are available in a smartphone (e.g. having less graphical processing resources than a larger computer such as a laptop, desktop, gaming computer, etc.).

The Loss Max-Pooling (LMP) loss function is based on [7], where the p-norm parameter is fixed to p=1 since this simplifies the function while retaining performance within the standard error bounds of the optimal p-norm parameter's performance according to [7]. Experiments further support the effectiveness of LMP for overcoming pixelwise class imbalance in semantic segmentation by applying LMP to the intrinsically class imbalanced task of fingernail segmentation.

The cascaded architecture is related to ICNet [8] in the sense that the neural network model herein combines shallow/high-resolution and deep/low-resolution branches. Unlike ICNet, the model is designed to run on mobile devices, and therefore the encoder and decoder are completely redesigned based on this requirement.

5.2 Dataset

Due to a lack of prior work specifically on fingernail tracking, an entirely new dataset was created for this task. Egocentric data was collected from participants, who were asked to take either photos or videos of their hands as if they were showing off their fingernails for a post on social media.

Figure 2:
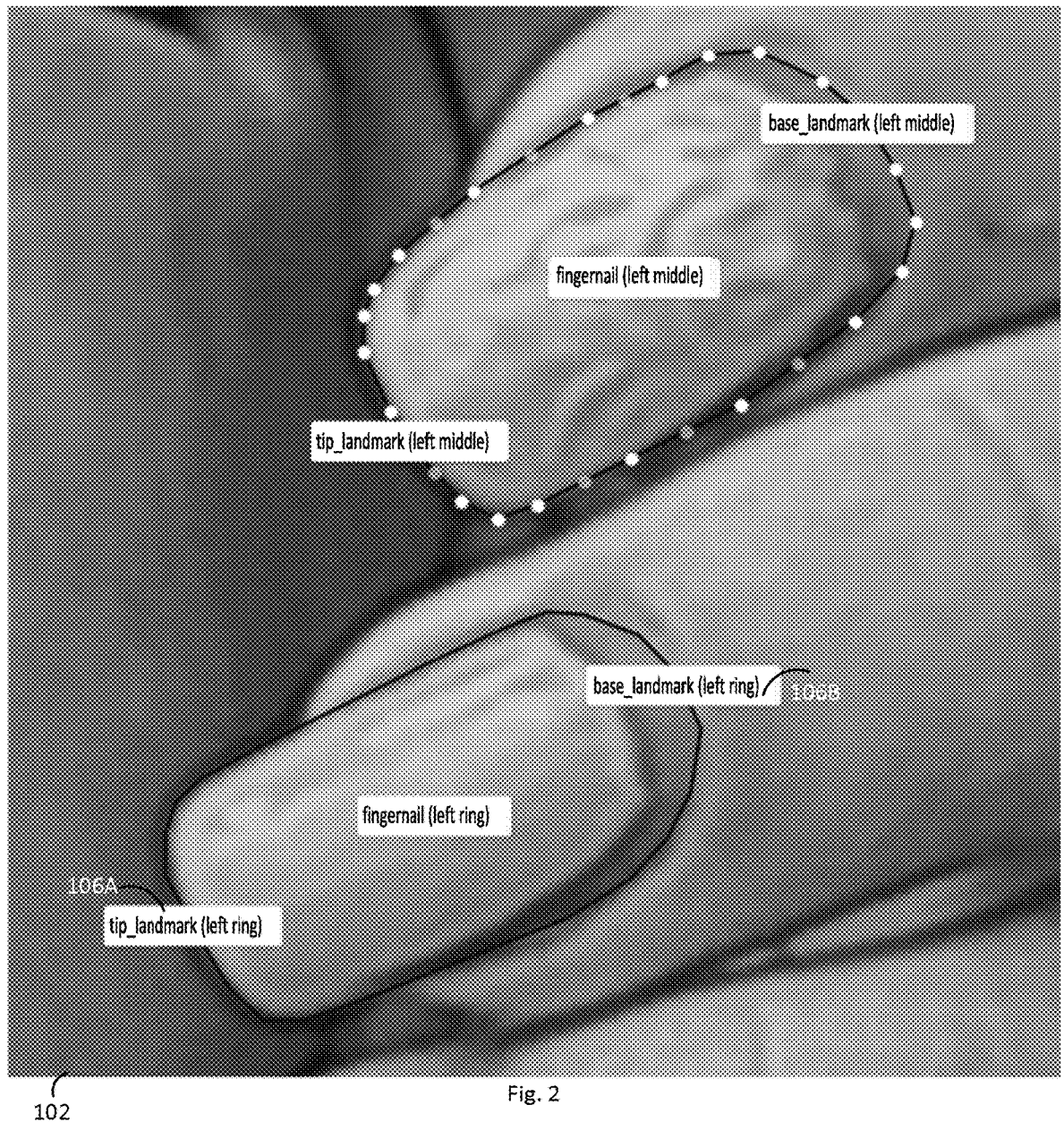
FIG. 2 is a screen shot of a portion of a GUI with which to define annotated data for a dataset in accordance with an example.

Dense semantic segmentation labels were created using polygons, which are an easy-to-annotate and accurate label type for rigid objects such as fingernails. Since the model is trained on dense labels, the polygon annotation method could also be replace with pixel-wise annotations. Shown in FIGS. 1 and 2 are an example of an interface 100 used for creating nail annotations through a combination of three label types. FIG. 1 shows interface 100 with portion 102 to display and receive input for an image to be annotated for the dataset. Interface 100 also includes portion 104 having a number of controls such as radio button controls to set data (e.g. flags). Other controls in portion 104 are available for defining the polygons and marking landmarks (e.g. tip landmark 106A and base landmark 106B), etc.

Interface 100 therefore enables:

1. Polygons to enclose fingernail pixels (i.e., to separate foreground fingernails from background).
2. Per-polygon class labels to identify individual fingernails. Each polygon in the dataset represents a fingernail and is classified as one of ten fingernail classes, i.e., "left pinky", "right thumb", etc. See 102 in FIG. 2.
3. Base and tip landmarks to define per-polygon orientation. The fingernail base/tip landmarks are used to generate a dense direction field, which is the same spatial resolution as the input image, and each pixel has a pair of values representing the x and y direction from base to tip for the fingernail that that pixel belongs to.

The new annotated dataset consists of 1438 annotated images in total, which are split into train, validate and test sets based on the participant who contributed the images (i.e., each participant's images belongs to either train, val or test exclusively). The split dataset contains 941, 254 and 243 images each in train, validate and test, respectively. In experiments the model was trained on the training set and evaluated on the validation set.

5.3 Model

The core of the nail tracking system (e.g. a computing device configured as described herein) is an encoder-decoder convolutional neural network (CNN) architecture trained to output foreground/background and fingernail class segmentations, as well as directionality information (e.g. base-tip direction fields). The model architecture is related to ICNet [8], however changes were made to adapt the model to be fast enough to run on mobile devices, and to produce the multi-task outputs. A top-level view of the model architecture is illustrated in FIG. 3.

Figure 3:
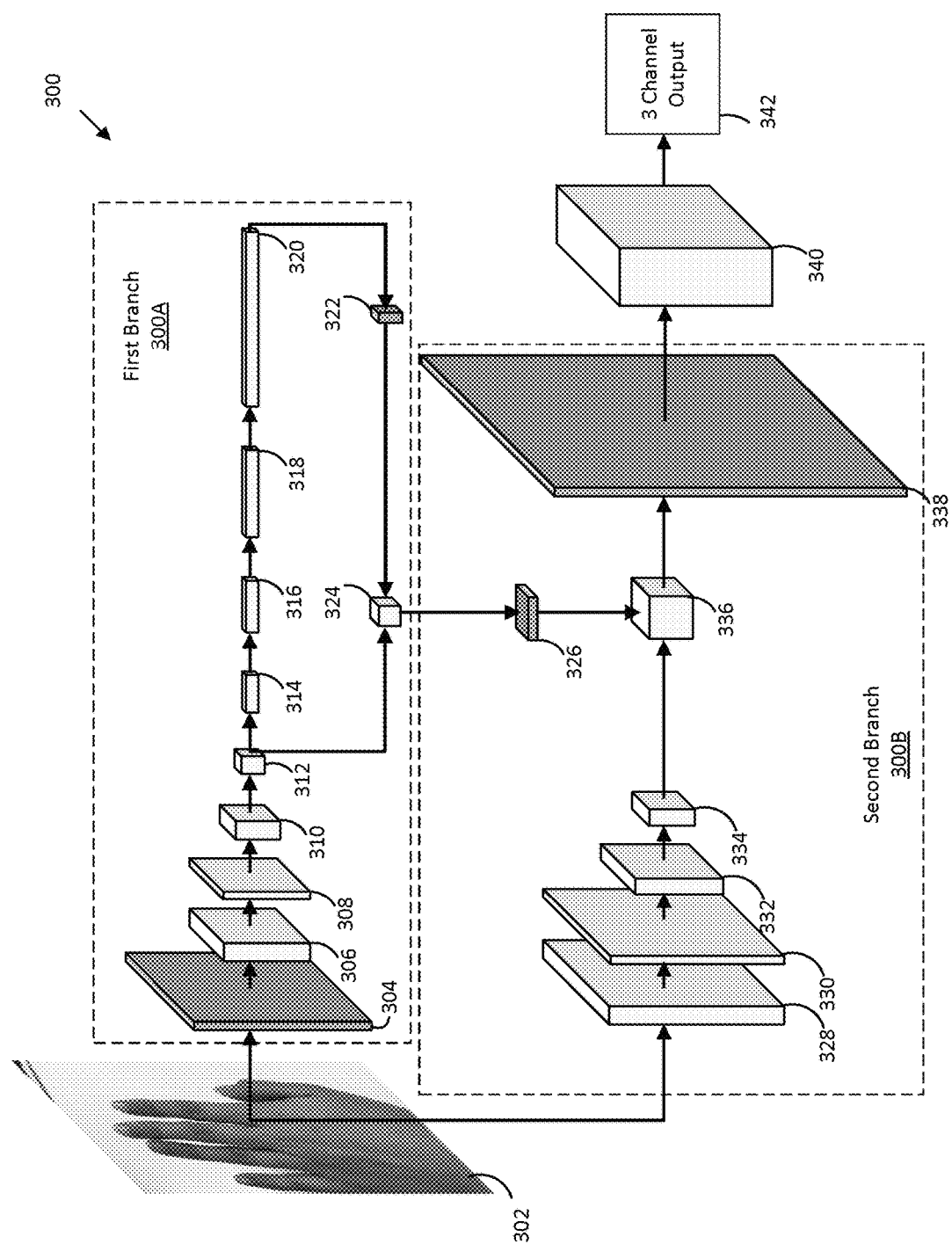
FIG. 3 is a graphic illustration of a CNN processing an image in accordance with an example.

FIG. 3 shows model 300 processing an input (image) 302 using two branches. The first branch 300A (upper branch in FIG. 3) comprises blocks 304-324. The second branch 300B (lower) in FIG. 3 comprises blocks 326-338. It will be appreciated that these bright-line distinctions may be modified. For example, block 326 may be a block of the first branch 300A. Block 304 is a downsampling×2 block. Blocks 306-320 (also referenced as stage_low1, stage_low2, . . . stage-low8) are blocks of the encoder-decoder backbone (having an encoder phase and a decoder phase) as further described. Block 322 is an upsampling×2 block and block 324 is a first branch fusion block as further described. Block 326 is also an upsample×2 block. Blocks 326-332 are (also referenced as stage_high1, stage_high2, . . . stage-high4) are blocks of an encoder phase as further described. The encoder-decoder backbone is modelled upon MobileNetV2 [2]. Further details are shown in Table 1. The encoder phase (blocks 328-332) of the second branch is also modelled upon the encoder of MobileNetV2 [2].

The encoder of the model was initialized with MobileNetV2 [2] model weights pre-trained on ImageNet [9]. There was used a cascade of two α=1.0 MobileNetV2 encoder backbones (i.e. the encoder phases), both pre-trained on 224×224 ImageNet images. The encoder cascade (from the respective branches) consists of one shallow network with high-resolution inputs (stage_high1 . . . 4), and one deep network with low-resolution inputs (stage_low1 . . . 8), both of which are prefixes of the full MobileNetV2. For the low-resolution encoder of the first branch stage 6 was changed from stride 2 to stride 1, and to compensate for this change, there was used dilated 2× convolutions in stages 7 and 8. Hence the output stride of the low-resolution encoder is 16× with respect to its input, instead of 32× as in the original MobileNetV2. See Table 1 for a detailed layer-by-layer description. Table 1 shows a detailed summary of the fingernail segmentation model architecture. Each layer name corresponds to the blocks in FIGS. 3 and 4 as described herein. Height H and width W refer to the full resolution H×W input size. For projection 408 and dilated layers 410, p∈{16, 8}. For stages stage3_low to stage7_low, the number of channels in parentheses is for the first layer of the stage (not shown), which increases to the unparenthesized number for subsequent layers in the same stage.

TABLE 1

| layer name | output size | iOS | TF.js |
|---|---|---|---|
| stage1_low | $\frac{H}{4} \times \frac{W}{4}$ | 3 × 3, 32, stride 2 | |
| stage2_low | $\frac{H}{4} \times \frac{W}{4}$ | $\begin{bmatrix} 1\times1, 32 \\ 3\times3, 32 \\ 1\times1, 16 \end{bmatrix} \times 1$ | |
| stage3_low | $\frac{H}{8} \times \frac{W}{8}$ | $\begin{bmatrix} 1\times1, 144\ (96) \\ 3\times3, 144\ (96) \\ 1\times1, 24 \end{bmatrix} \times 2$ | |
| stage4_low | $\frac{H}{16} \times \frac{W}{16}$ | $\begin{bmatrix} 1\times1, 192\ (144) \\ 3\times3, 192\ (144) \\ 1\times1, 32 \end{bmatrix} \times 3$ | |
| stage5_low | $\frac{H}{32} \times \frac{W}{32}$ | $\begin{bmatrix} 1\times1, 384\ (192) \\ 3\times3, 384\ (192) \\ 1\times1, 64 \end{bmatrix} \times 4$ | |
| stage6_low | $\frac{H}{32} \times \frac{W}{32}$ | $\begin{bmatrix} 1\times1, 576\ (384) \\ 3\times3, 576\ (384) \\ 1\times1, 96 \end{bmatrix} \times 3$ | |
| stage7_low | $\frac{H}{32} \times \frac{W}{32}$ | $\begin{bmatrix} 1\times1, 960\ (576) \\ 3\times3, 960\ (576), \text{dilated}\times2 \\ 1\times1, 160 \end{bmatrix} \times 3$ | N/A |
| stage8_low | $\frac{H}{32} \times \frac{W}{32}$ | $\begin{bmatrix} 1\times1, 960 \\ 3\times3, 960, \text{dilated}\times2 \\ 1\times1, 320 \end{bmatrix} \times 1$ | N/A |
| stage 1-4_high same as stage 1-4_low with in/out size × 2 | | | |
| projection_p | $\frac{H}{p} \times \frac{W}{p}$ | 1 × 1, 320 | |
| dilated_p | $\frac{H}{p} \times \frac{W}{p}$ | [3 × 3, 320, dilated] × 2 | |

Figure 4:
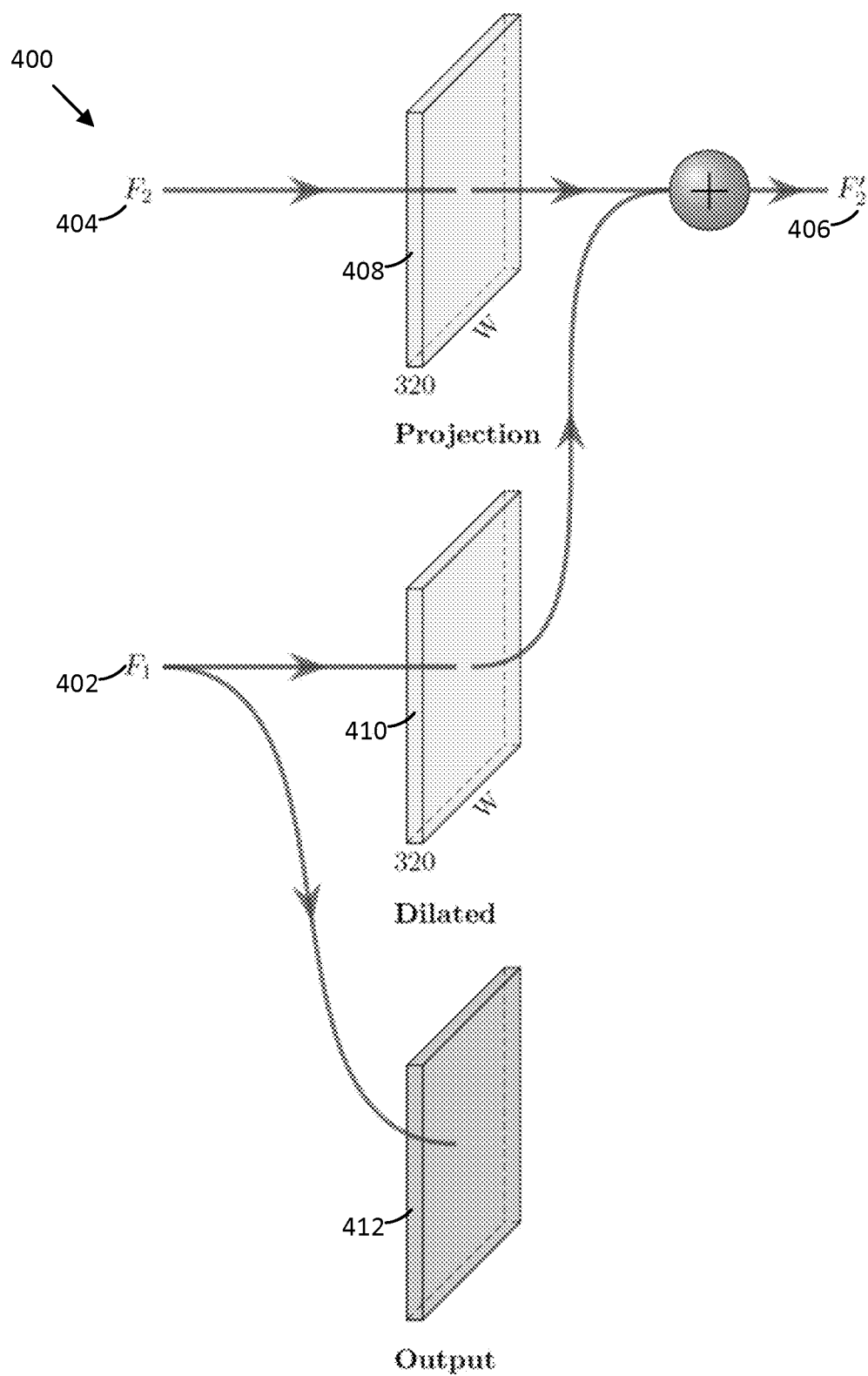
FIGS. 4 and 5 are respective graphic illustrations of portions of the CNN of FIG. 3.

The decoder of model 300 is shown in the middle and bottom right of FIG. 3 (e.g. blocks 324 and 336 (comprising fusion blocks) and upsampling blocks 322 and 326) and a detailed view of the decoder fusion model for each of blocks 324 and 336 is shown in FIG. 4. For an original input of size H×W, the decoder fuses the $$\frac{H}{16} \times \frac{W}{16}$$

features from stage_low4 (from block 312) with the upsampled features from block 322 derived from stage_low8, then upsamples (block 326) and fuses the resulting features via fusion block 336 with the $$\frac{H}{8} \times \frac{W}{8}$$

features from stage_high4 (block 334).

Figure 5:
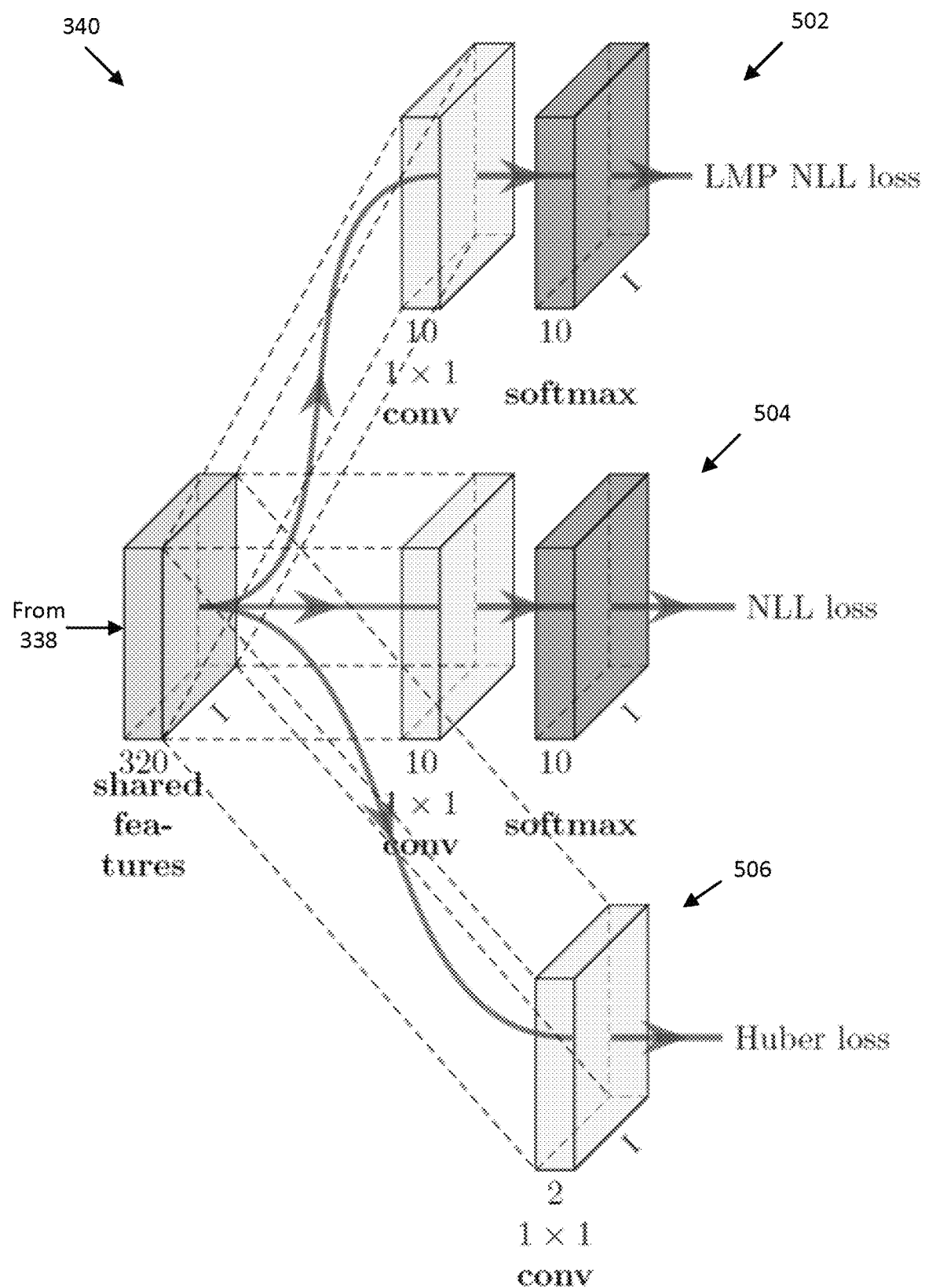

FIG. 4 depicts the fusion module 400 used to fuse upsampled low-resolution, high semantic information features represented by feature map $F_1$ (402) with high-resolution, low semantic information features represented by feature map $F_2$ (404) to produce high-resolution fused features represented by feature map $F'_2$ (406) in the decoder using blocks 408, 410, 412 and adder 414. In relation to block 324, feature map $F_1$ (402) is output from block 322 and feature map $F_2$ (404) is output from block 312. Feature map F'$_2$ (406) from block 324 is upsampled at 326 for providing to block 336 as feature map F$_1$ (402) in that block's instance of model 400. In block 336, feature map F$_2$ (404) is output received from block 334 and feature map F'$_2$ (406) is provided as output to block 338. Block 338 upsamples to input resolution/4 and then provides the resulting feature map to decoder model 340. Decoder model 340 is depicted in FIG. 5. The decoder model 340 produces three types of information for the image (e.g. a 3 channel output 342) as described further in relation to FIG. 5.

As shown in FIG. 4, a 1×1 convolutional classifier 412 is applied to the upsampled features, which are used to predict down-sampled labels. As in [10], this "Laplacian pyramid" of outputs optimizes the higher-resolution, smaller receptive field feature maps to focus on refining the predictions from low-resolution, larger receptive field feature maps. Thus, in model 400, the feature map (not shown) from block 412 is not used as output per se. Rather, in training, the loss function is applied in a form of pyramid output regularization (viz. the loss applied at FIG. 5).

Block 342 represents one global output from the decoder that comprises three channels corresponding to outputs of the blocks from the three branches 502, 504 and 506 of FIG. 5. A first channel comprises a per pixel classification (e.g. a foreground/background mask or object segmentation masks), a second channel comprises classification of the segmented masks into individual fingertip classes, and a third channel comprises a field of 2D directionality vectors per segmented mask pixel (e.g. (x,y) per pixel).

Shown in FIG. 5, the decoder uses multiple output decoder branches 502, 504 and 506 to provide directionality information (e.g. vectors from base to tip in the third channel) needed to render over fingernail tips, and fingernail class predictions (in the second channel) needed to find fingernail instances using connected components. These additional decoders are trained to produce dense predictions penalized only in the annotated fingernail area of the image. Each branch employs a respective loss function according to the example. While, a normalized exponential function (Softmax), is shown in branches 502 and 504 another activation function for segmentation/classification may be used. It will be understood that dimensions herein are representative and may be adapted for different tasks. For example, in FIG. 5, branches 502, 504 relate to 10 classes and are dimensioned accordingly.

Figure 6:
FIG. 6 is a 4×4 array of images processed using a CNN in accordance with an example herein showing foreground and background mask and directionality information.
Figure 7A:
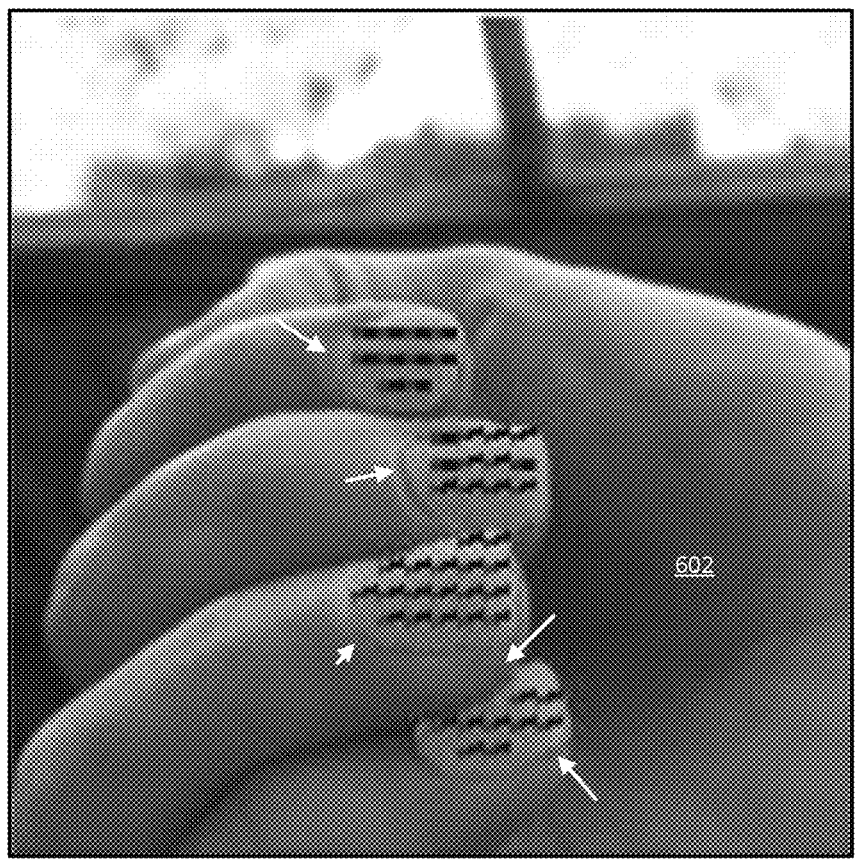
FIGS. 7A-7C are enlarged portions of FIG. 6.
Figure 7B:
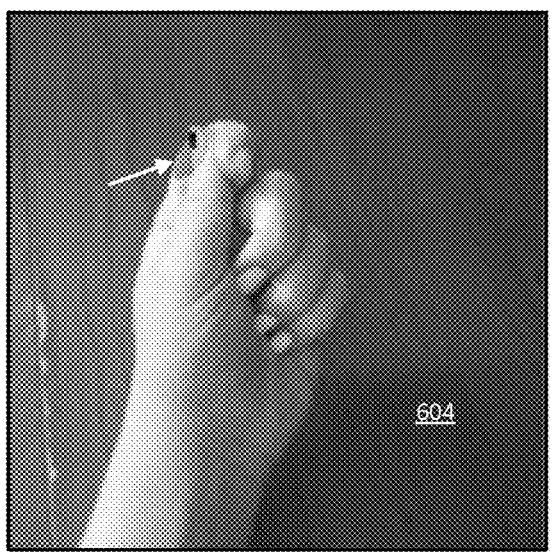
Figure 7C:
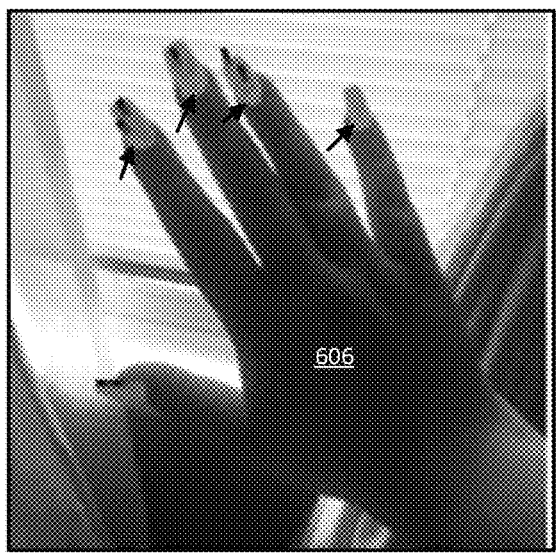

Binary (i.e., fingernail vs. background) predictions are visualized in FIG. 6 along with direction field predictions. That is, FIG. 6 shows a 4×4 array 600 of updated images produced from input images that were processed. The foreground/background masks were used to identify the respective nails for coloring. The nail regions are pixel-wise colored (though here depicted in greyscale), to show agreement with ground truth as well as false positive and false negative identifications in the foreground/background masks. The updated images of array 600 also show directionality information. FIGS. 6A, 6B and 6C show enlarged images 602, 604 and 606 from array 600 with annotations where the white arrows point to false positive regions and the black arrows point to false negative regions. In image 604, there is shown a common failure mode where an unseen hand pose causes over-segmentation. In image 606, there is shown an example of under-segmentation due to an unseen lighting/nail colour combination. It is expected that both failure cases can be improved by adding related training data.

Figure 8:
FIG. 8 is a 4×4 array of images processed using a CNN in accordance with an example herein showing application of object class segmentation masks for respective nails.
Figure 9:
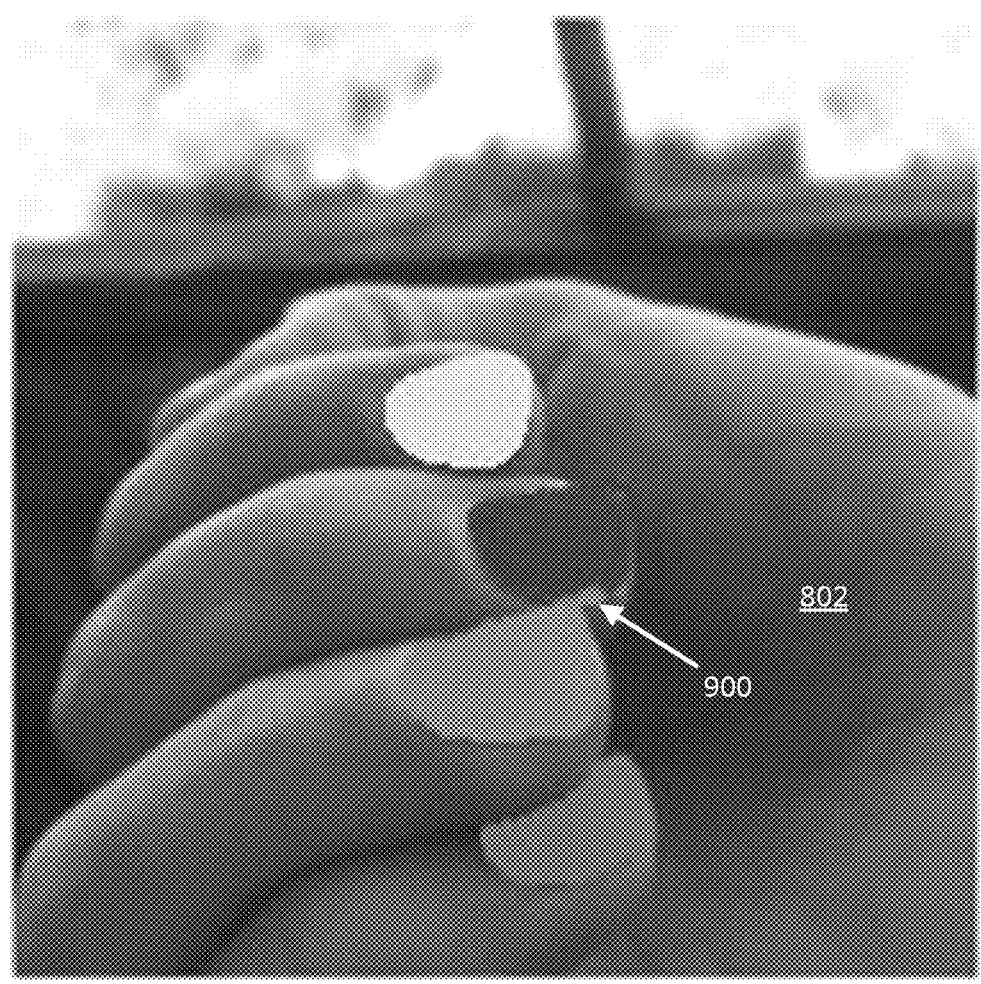
FIG. 9 is an enlarged portion of FIG. 8.

Individual class predictions for each hand/finger combination (e.g., left pinky) are visualized in 4×4 array 800 of FIG. 8 only in the fingernail area. FIG. 9 shows enlarged image 802 with an annotation (a white arrow 900) indicating a leaking of one class (ring finger) into another (middle finger). The class leaks because the nails are overlapping due to the perspective of the camera. This may be improved with dense CRF or guided filter post-processing.

5.4 Inference (Training Details)

The neural network models were trained using PyTorch [11]. The trained models were deployed to iOS using Core ML, and to web browsers using TensorFlow.js [1].

Data augmentations included contrast normalization and frequency noise alpha blending augmentations, as well as random scale, aspect ratio, rotation and crop augmentations. Contrast normalization adjusts contrast by scaling each pixel value Iij to 127+α(Iij−127), where α∈[0.5, 2.0]. Frequency noise alpha blending blends two image sources using frequency noise masks. There was uniform randomly sampled scale augmentations from [½,2], aspect ratio stretching augmentations from [⅔, 3/2], rotation augmentations from ±180°, and randomly cropped square images of side length $^{14}/_{15}$ of a given down-sampled training image's shorter side length.

Given current software implementations, namely Core ML and TensorFlow.js, and current mobile device hardware, the system can run in real-time (i.e., at >10 FPS) at all resolutions up to 640×480 (native mobile) and 480×360 (web mobile), for which the model was trained on input resolutions of 448×448 and 336×336, respectively. All input images were normalized by the mean and standard deviation of the ImageNet dataset. The MobileNetV2 encoder backbone was pre-trained on ImageNet for 400 epochs using SGD with Nesterov momentum of 0.9, and decreasing the initial learning rate of $10^{-2}$ by a factor of 10 at epochs 200 and 300.

The encoder-decoder model was trained for 400 epochs on the fingernail tracking dataset. In order to retain pre-trained weight values, for all pre-trained layers, i.e., stage_high1 . . . 4 and stage_low1 . . . 8, a lower initial learning rate of 5×10$^{-3}$ was used, while for all other layers there was used an initial learning rate of 5×10$^{-2}$ Following prior work [12], there was used a polynomial decay learning rate schedule according to $$l_t = l_0\left(1 - \frac{t}{T}\right)^{0.9}$$

where $l_t$ is the learning rate at iteration t, and T is the total number of steps. A batch size of 32 was used. The optimizer was SGD with a Nesterov momentum of 0.99, with a weight decay of 10$^{-4}$ on the model weights. There was clipped gradients at 1.0. The LMP loss function computes the loss as the mean loss of the 10% of pixels with the highest loss value.

5.5 Objective Function Discussion

To deal with the class imbalance between background (overrepresented class) and fingernail (underrepresented class), in the objective function there was used Loss Max Pooling [7] over all pixels in a mini-batch by sorting by the loss magnitude of each pixel, and taking the mean over the top 10% of pixels as the mini-batch loss. It was found that using loss max pooling yielded a gain of ≈2% mIoU as evaluated on the validation set when compared with a baseline that just weighted the fingernail class by 20× more than the background, where the mIoU improvement was reflected in sharper nail edge appearance along class boundaries (where the naive baseline consistently over-segmented).

There was used three loss functions corresponding to the three outputs of the model shown in FIG. 5. The fingernail class and foreground/background predictions both minimize the negative log-likelihood of a multinomial distribution given in Equation 1, where c is the ground truth class, $x_c^{ij}$ is the pre-softmax prediction of the cth class by the model, and $\mathcal{L}^{ij}$ is the loss for the pixel at $(x,y)=(i,j)$.

$$\mathcal{L}_{class,f\_gbg}^{ij} = -\log\left(\frac{\exp x_c^{ij}}{\sum_{c'} \exp x_{c'}^{ij}}\right) \quad (1)$$

In the case of class predictions $c \in \{1,2,\ldots,10\}$, while for foreground/background predictions $c \in \{1,2\}$. LMP was used for foreground/background predictions only; since fingernail class predictions are only valid in the fingernail region, those classes are balanced and do not require LMP.

$$l_{f\_gbg} = \frac{1}{N_{thresh}} \sum_{ij} [\mathcal{L}_{f\_gbg}^{ij} > \tau] \cdot \mathcal{L}_{f\_gbg}^{ij} \quad (2)$$

In Equation 2, $N_{thresh}=\Sigma ij[\mathcal{L}_{fgbg}^{ij}>\tau]$, and threshold $\tau$ is the loss value of the $[0.1 \times H \times W]$th highest loss pixel. The $[\cdot]$ operator is the indicator function.

For the direction field output, there was applied a Huber loss on the normalized base to tip direction of the nail for each pixel inside the ground truth nail. This is to deemphasize the field loss once it is approximately correct, since approximate correctness of base-tip direction is all that is needed for rendering, and this prevents the direction field loss from detracting from the binary and class fingernail segmentation losses. Other loss functions such as $L^2$ and $L^1$ error could also be used in the system in place of the Huber loss.

$$\mathcal{L}_{field}^{ijk} = \begin{cases} 0.5(\hat{u}_{field}^{ijk} - u_{field}^{ijk})^2 & \text{if } |\hat{u}_{field}^{ijk} - u_{field}^{ijk}| < 1. \\ |\hat{u}_{field}^{ijk} - u_{field}^{ijk}| - 0.5, & \text{otherwise} \end{cases} \quad (3)$$

In Equation 3, indices (i,j) are over all spatial pixel locations, while $k \in \{0,1\}$ indexes the (x,y) directions of the base-tip direction vector. Furthermore, each scalar field prediction $\hat{u}_{field}^{ijk}$ is normalized so that vector $\hat{u}_{field}^{ij} = (\hat{u}_{field}^{ij0}, \hat{u}_{field}^{ij1})^T$ is a unit vector, i.e $\|\hat{u}_{field}^{ij}\|=1$. The field direction labels are also normalized so that $\|u_{field}^{ij}\|=1$. For the direction field and the fingernail class losses there is no class imbalance problem, so they are simply the means of their respective individual losses, i.e., $$\ell_{class} = \frac{1}{N_{class}} \sum_{ij} \mathcal{L}_{class}^{ij} \text{ and}$$

$$\ell_{field} = \frac{1}{N_{field}} \sum_{ijk} \mathcal{L}_{field}^{ijk},$$

where $N_{class}=H \times W$ and $N_{field}=2 \times H \times W$. The overall loss is $l=l_{fgbg}+l_{class}+l_{field}$.

5.6 Post-Processing and Rendering

Outputs from the model may be used to process the input image and produced and updated image. In Method 1 (See too FIG. 10) there is describe a post-processing and rendering method, which uses the output of the CNN model's tracking predictions to draw realistic nail polish on a user's fingernails. The method uses the individual fingernail location and direction information predicted by a fingernail tracking module (using the CNN model) in order to render gradients, and to hide the light-coloured distal edge of natural nails.

Figure 10:
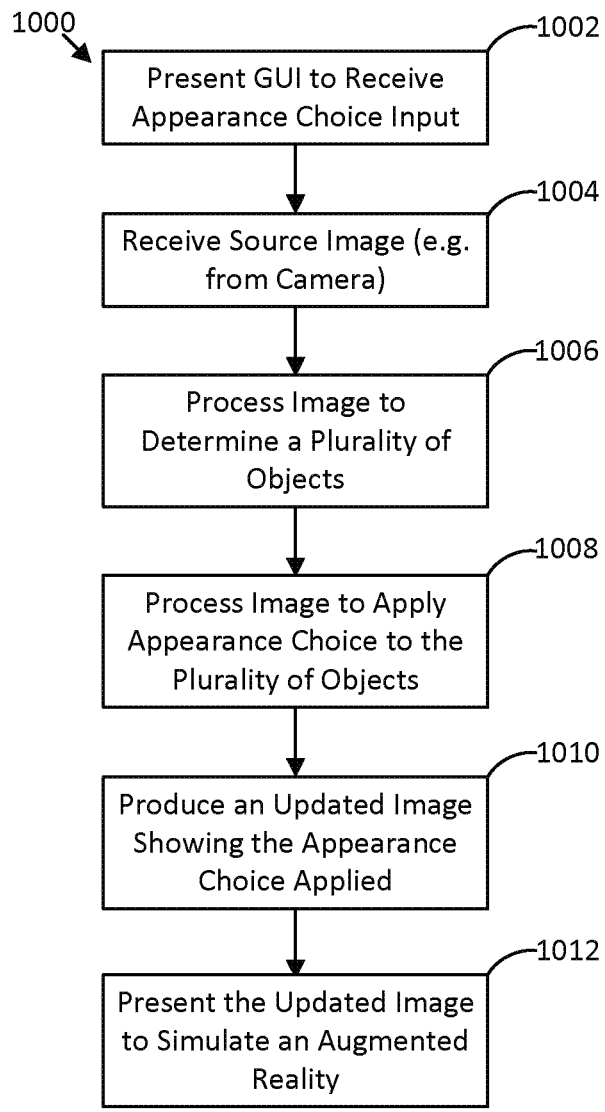
FIG. 10 is a flowchart of operations.

FIG. 10 shows operations 1000 of a computing device. The computing device comprises a CNN model as shown and described here and instructions to configure the computing device. Operations 1000 show the computing device, at step 1002, presenting a user interface (e.g. GUI) to receive an appearance choice to apply to a plurality of objects (e.g. fingernails). At 1004 operations receive as source image such as from a camera of the computing device. The source image may be a selfie still image or a selfie video image for use as an image to be processed. At 1006, the instructions configure the computing device to process the image to determine the plurality of objects, at 1008 processes the image to apply the appearance choice and at 1010 produce an updated image showing the appearance choice applied. The updated image may be present (at 1012) to simulate an augmented reality.

FIG. 11 shows "Method 1" comprising pseudo code 1100 for operations that may be used after processing by the CNN using the outputs from the CNN. Method 1 shows post-processing and nail polish rendering operations. The operations first uses the predicted nail directions to draw a gradient of a user's chosen colour over each nail, perpendicular to the nail direction, and masked out by the nail mask. Then, it copies specular components from the original nail, and blends them on top of the gradient.

6 MISCELLANEA

It will be understood that preprocessing may be used, for example to produce an input of required size, to center a desired portion of an image, correct lighting, etc prior to processing by the model.

Though described in relation to fingernails other objects may be tracked as described and the teachings herein adapted by a person of ordinary skill in the art. Though a color appearance effect is described to apply to produce an updated image, other appearance effects may be used. Appearance effects may be applied at or about the location(s) of the tracked objects.

In addition to computing device aspects, a person of ordinary skill will understand that computer program product aspects are disclosed, where instructions are stored in a non-transient storage device (e.g. a memory, CD-ROM, DVD-ROM, RAM, tape, disc, etc.) for execution by a processor to configure a computing device to perform any of the method aspects stored herein. The processor may be a CPU, GPU or other programmable device or a combination of one or more of any of such. As noted herein, one implementation was prepared using Core ML for iOS-based iPhone products from Apple Inc.

Practical implementation may include any or all of the features described herein. These and other aspects, features and various combinations may be expressed as methods, apparatus, systems, means for performing functions, program products, and in other ways, combining the features described herein. A number of embodiments have been described. Nevertheless, it will be understood that various modifications can be made without departing from the spirit and scope of the processes and techniques described herein. In addition, other steps can be provided, or steps can be eliminated, from the described process, and other components can be added to, or removed from, the described systems. Accordingly, other embodiments are within the scope of the following claims.

Throughout the description and claims of this specification, the word "comprise" and "contain" and variations of them mean "including but not limited to" and they are not intended to (and do not) exclude other components, integers or steps. Throughout this specification, the singular encompasses the plural unless the context requires otherwise. In particular, where the indefinite article is used, the specification is to be understood as contemplating plurality as well as singularity, unless the context requires otherwise. The term "and/or", for example, in relation to "A and/or B" herein means one of A, B and both A and B.

Features, integers characteristics, compounds, chemical moieties or groups described in conjunction with a particular aspect, embodiment or example of the invention are to be understood to be applicable to any other aspect, embodiment or example unless incompatible therewith. All of the features disclosed herein (including any accompanying claims, abstract and drawings), and/or all of the steps of any method or process so disclosed, may be combined in any combination, except combinations where at least some of such features and/or steps are mutually exclusive. The invention is not restricted to the details of any foregoing examples or embodiments. The invention extends to any novel one, or any novel combination, of the features disclosed in this specification (including any accompanying claims, abstract and drawings) or to any novel one, or any novel combination, of the steps of any method or process disclosed.

7 CONCLUSION

There is presented a model for fingernail tracking and operations for nail polish rendering. Using current software and hardware, a user computing device such as a smartphone or tablet may be configured to run in real time on both iOS and web platforms. The use of LMP coupled with the cascaded model architecture design simultaneously enables pixel-accurate fingernail predictions at up to 640×480 resolution. There are proposed post-processing operations that take advantage of the model's multiple output predictions to render gradients on individual fingernails, and to hide the light coloured distal edge when rendering on top of natural fingernails by stretching the nail mask in the direction of the fingernail tip.

REFERENCES

Each of the references [1] to [13] listed below is incorporated herein by reference:

[1] Daniel Smilkov, Nikhil Thorat, Yannick Assogba, Ann Yuan, Nick Kreeger, Ping Yu, Kangyi Zhang, Shanqing Cai, Eric Nielsen, David Soergel, Stan Bileschi, Michael Terry, Charles Nicholson, Sandeep N. Gupta, Sarah Sirajuddin, D. Sculley, Rajat Monga, Greg Corrado, Fernanda B. Viégas, and Martin Wattenberg. Tensorflow.js: Machine learning for the web and beyond. *arXiv preprint arXiv:* 1901.05350, 2019.

[2] Mark Sandler, Andrew Howard, Menglong Zhu, Andrey Zhmoginov, and Liang-Chieh Chen. Mobilenetv2: Inverted residuals and linear bottlenecks. In *The IEEE Conference on Computer Vision and Pattern Recognition (CVPR)*, June 2018.

[3] Xiangyu Zhang, Xinyu Zhou, Mengxiao Lin, and Jian Sun. Shufflenet: An extremely efficient convolutional neural network for mobile devices. In *The IEEE Conference on Computer Vision and Pattern Recognition (CVPR)*, 2018.

[4] Robert J Wang, Xiang Li, and Charles X Ling. Pelee: A real-time object detection system on mobile devices. In *Advances in Neural Information Processing Systems* 31, 2018.

[5] Forrest N. Iandola, Song Han, Matthew W. Moskewicz, Khalid Ashraf, William J. Dally, and Kurt Keutzer. Squeezenet: Alexnet-level accuracy with 50× fewer parameters and <0.5 mb model size. *arXiv:* 1602.07360, 2016.

[6] Barret Zoph, Vijay Vasudevan, Jonathon Shlens, and Quoc V. Le. Learning transferable architectures for scalable image recognition. In *The IEEE Conference on Computer Vision and Pattern Recognition (CVPR)*, 2018.

[7] Samuel Rota Bulo, Gerhard Neuhold, and Peter Kontschieder. Loss max-pooling for semantic image segmentation. In *The IEEE Conference on Computer Vision and Pattern Recognition (CVPR)*, 2017.

[8] Hengshuang Zhao, Xiaojuan Qi, Xiaoyong Shen, Jianping Shi, and Jiaya Jia. Icnet for realtime semantic segmentation on high-resolution images. In *ECCV*, 2018.

[9] J. Deng, W. Dong, R. Socher, L.-J. Li, K. Li, and L. Fei-Fei. ImageNet: A Large-Scale Hierarchical Image Database. In *The IEEE Conference on Computer Vision and Pattern Recognition (CVPR)*, 2009.

[10] Golnaz Ghiasi and Charless C. Fowlkes. Laplacian reconstruction and refinement for semantic segmentation. In *ECCV*, 2016.

[11] Adam Paszke, Sam Gross, Soumith Chintala, Gregory Chanan, Edward Yang, Zachary DeVito, Zeming Lin, Alban Desmaison, Luca Antiga, and Adam Lerer. Automatic differentiation in pytorch. In *NIPS-W*, 2017.

[12] Liang-Chieh Chen, George Papandreou, Iasonas Kokkinos, Kevin Murphy, and Alan L. Yuille. Deeplab: Semantic image segmentation with deep convolutional nets, atrous convolution, and fully connected crfs. *arXiv preprint arXiv:* 1606.00915, 2016.

[13] C. Grana, D. Borghesani, and R. Cucchiara. Optimized block-based connected components labeling with decision trees. *IEEE Transactions on Image Processing,* 2010.

We claim:

1. A computing device comprising a processor and a storage device coupled thereto, the storage device storing a convolutional neural network (CNN) and instructions, which when executed by the processor, configure the computing device to:
    process an image comprising a plurality of objects with the CNN, the CNN configured to semantically segment the plurality of objects within the image, the CNN comprising a cascaded semantic segmentation model architecture having:
    a first branch providing deep learning of low resolution features; and
    a second branch providing shallow learning of high-resolution features;

wherein the CNN combines respective predictions from the first branch and the second branch to output information comprising foreground/background and object class segmentations.

2. The computing device of claim 1 wherein the CNN combines the respective predictions from the first branch and the second branch such that the information as output from the CNN further comprises directionality information.

3. The computing device of claim 2 wherein each object has a base and a tip and the directionality information comprises base-tip direction fields.

4. The computing device of claim 2 wherein the CNN uses multiple output decoder branches to produce the foreground/background and object class segmentations and the directionality information.

5. The computing device of claim 2 wherein the CNN is trained using a Huber loss function to determine the directionality information.

6. The computing device claim 1 wherein the first branch comprises an encoder-decoder backbone to produce respective predictions of the first branch.

7. The computing device of claim 6 wherein a respective prediction of the first branch comprises a combination of an initial prediction produced following an encoder phase of the first branch with a further prediction produced following further processing by a decoder phase of the first branch.

8. The computing device of claim 7 wherein the initial prediction and further prediction are combined using a first branch fusion block to produce the respective prediction of the first branch for providing for further combining with a respective prediction of the second branch.

9. The computing device of claim 1 wherein a respective prediction of the second branch is produced following processing by an encoder phase of the second branch, in cascade with the first branch.

10. The computing device of claim 9 wherein a respective prediction ($F_1$) of the first branch is combined with the respective prediction ($F_2$) of the second branch using a second branch fusion block.

11. The computing device of claim 10 wherein $F_1$ comprises up-sampled low-resolution, high semantic information features and $F_2$ comprises high-resolution, low semantic information features and wherein the second branch fusion block combines $F_1$ and $F_2$ to produce high-resolution fused features $F_2'$ in a decoder phase of the second branch.

12. The computing device of claim 10 wherein the CNN uses a convolutional classifier applied to the respective prediction $F_1$ to produce down-sampled class labels.

13. The computing device of claim 1 wherein the CNN is trained using a Loss Max-Pooling (LMP) loss function for overcoming pixel-wise class imbalance in semantic segmentation to determine the foreground/background segmentations.

14. The computing device of claim 1 wherein the CNN is trained using a negative log likelihood loss (NLL) function to determine the foreground/background and object class segmentations.

15. The computing device of claim 1 wherein the instructions further configure the computing device to perform image processing to produce an updated image from the image using at least some of the information as output.

16. The computing device of claim 15 wherein to perform image processing uses the at least some of the foreground/background and object class segmentations and directionality information to change an appearance of the plurality of objects.

17. The computing device of claim 16 comprising a camera and wherein the instructions configure the computing device to:
present a user interface to receive an appearance choice to apply to the plurality of objects and receive, from the camera, a selfie video image for use as the image and;
process the selfie video image to produce the updated image using the appearance choice; and
present the updated image to simulate an augmented reality.

18. The computing device of claim 1 comprising a smartphone or tablet.

19. The computing device of claim 1 wherein the image comprises at least a portion of a hand having fingernails and wherein the plurality of objects comprise fingernails.

20. A method comprising:
processing an image comprising a plurality of objects with a convolutional neural network (CNN), the CNN configured to semantically segment the plurality of objects within the image, the CNN comprising a cascaded semantic segmentation model architecture having:
a first branch providing deep learning of low resolution features; and
a second branch providing shallow learning of high-resolution features;
wherein the CNN combines respective predictions from the first branch and the second branch to output information comprising foreground/background and object class segmentations.

21. The method of claim 20 wherein the CNN combines the respective predictions from the first branch and the second branch such that the information as output by the CNN further comprises directionality information.

22. The method of claim 21 wherein the CNN uses multiple output decoder branches to produce the foreground/background and object class segmentations and the directionality information.

23. The method of claim 21 wherein each object has a base and a tip and the directionality information comprises base-tip direction fields.

24. The method of claim 21 comprising performing image processing to produce an updated image from the image using at least some of the information as output from the CNN.

25. The method of claim 24 wherein performing image processing uses the at least some of the foreground/background and object class segmentations and directionality information to change an appearance such as a colour of the plurality of objects.

26. The method of claim 25 comprising:
presenting a user interface to receive an appearance choice to apply to the plurality of objects;
receiving from a camera a selfie video image for use as the image and;
processing the selfie video image to produce the updated image using the appearance choice; and
presenting the updated image to simulate an augmented reality.

27. A computing device comprising a processor and a storage device coupled thereto, the storage device storing instructions, which when executed by the processor, configure the computing device to:

receive convolutional neural network (CNN) output comprising foreground/background segmentations, object class segmentations and directionality information for each of a plurality of objects semantically segmented by a CNN having processed an image comprising the plurality of objects; and process the image to produce an updated image by:

drawing a gradient of a chosen color over each of the plurality of objects as segmented according to the foreground/background segmentations and object class segmentations, the chosen color drawn perpendicular to a respective direction of each of the objects as indicated by the directional information.

28. The computing device of claim 27 further configured to apply respective specular components for each of the plurality of objects over the gradient and blend a result.

29. The computing device of 27 further configured to, prior to drawing, stretch respective regions of each of the plurality of objects as identified by the foreground/background segmentations to ensure a margin such as a tip thereof is included for drawing.

30. The computing device of claim 29 further configured to, prior to drawing, colour at least some adjacent regions outside the respective regions of each of the plurality of objects as stretched with an average colour determined from the plurality of objects; and blur the respective regions of each of the plurality of objects as stretched and the adjacent regions.

31. The computing device of claim 27 further configured to receive a chosen colour for use when drawing.

32. A method comprising:

receiving output comprising foreground/background segmentations, object class segmentations and directionality information for each of a plurality of objects semantically segmented by a convolutional neural network (CNN) having processed an image comprising the plurality of objects; and processing the image to produce an updated image by:

drawing a gradient of a chosen color over each of the plurality of objects as segmented according to the foreground/background segmentations and object class segmentations, the chosen color drawn perpendicular to a respective direction of each of the objects as indicated by the directional information.

* * * * *